No. 894,387.
H. B. LESTER.
PATENTED JULY 28, 1908.
TUBULAR STOCK SPINDLE FOR AUTOMATIC ROD OR WIRE WORKING MACHINES.
APPLICATION FILED MAR. 15, 1907.
2 SHEETS—SHEET 1.
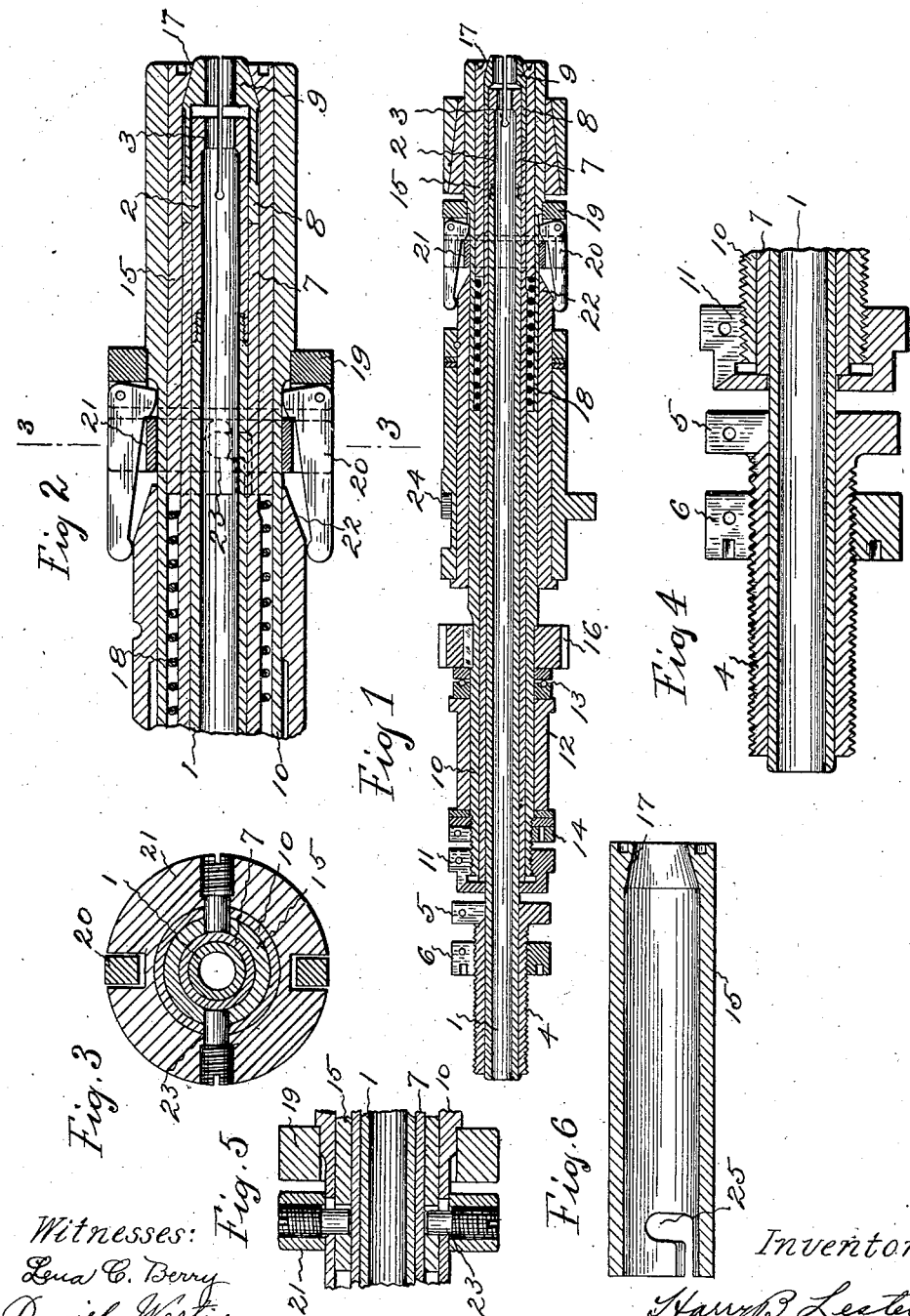
Witnesses:
Lena C. Berry
Daniel Westin
Inventor:
Harry B. Lester, by
Harry R. Williams
Attorney.

No. 894,387. PATENTED JULY 28, 1908.
H. B. LESTER.
TUBULAR STOCK SPINDLE FOR AUTOMATIC ROD OR WIRE WORKING MACHINES.
APPLICATION FILED MAR. 15, 1907.
2 SHEETS—SHEET 2.
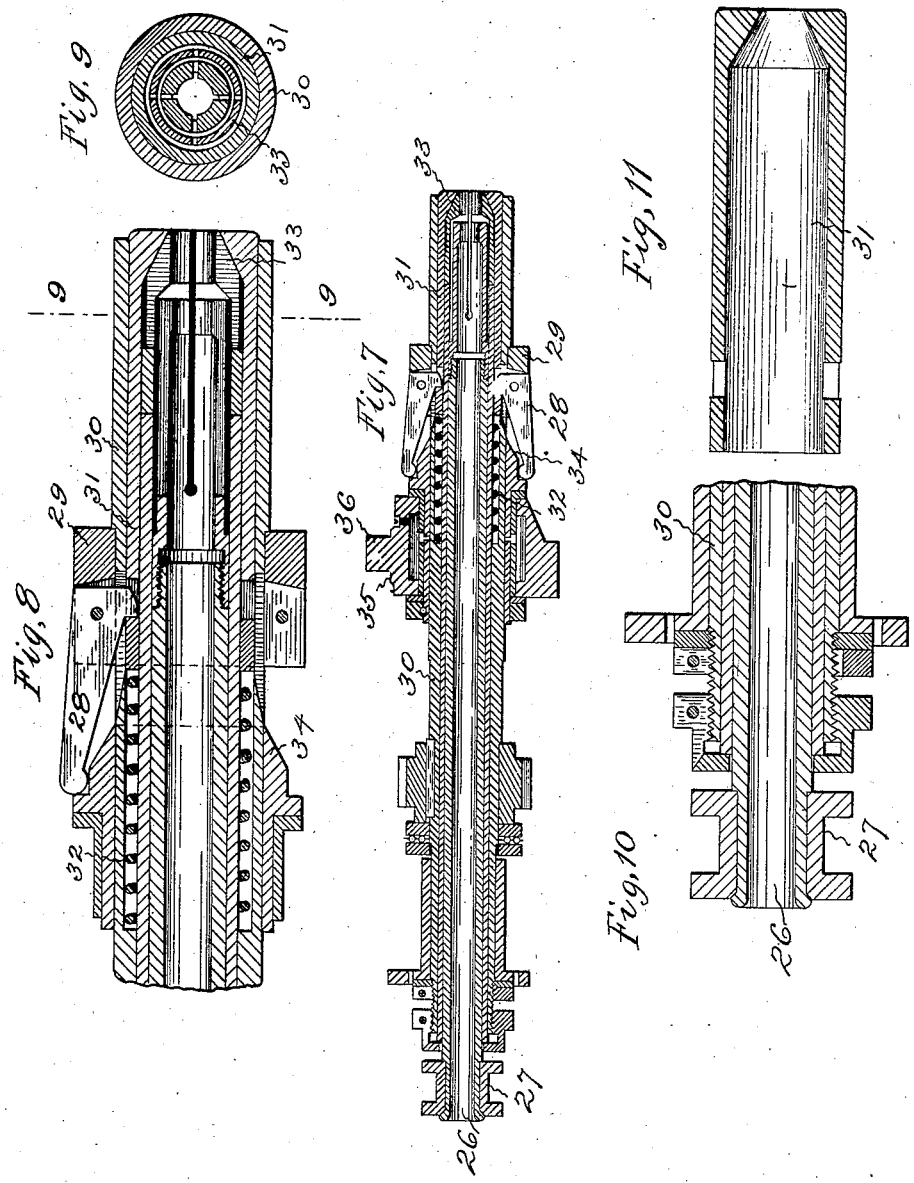

UNITED STATES PATENT OFFICE.

HARRY B. LESTER, OF HARTFORD, CONNECTICUT.

TUBULAR STOCK-SPINDLE FOR AUTOMATIC ROD OR WIRE WORKING MACHINES.

No. 894,387.  Specification of Letters Patent.  Patented July 28, 1908.

Application filed March 15, 1907. Serial No. 362,497.

*To all whom it may concern:*

Be it known that I, HARRY B. LESTER, a citizen of the United States, residing at Hartford, in the county of Hartford and State of Connecticut, have invented a new and useful Tubular Stock-Spindle for Automatic Rod or Wire Working Machines, of which the following is a specification.

The invention relates to the stock holding spindles which are used in screw and in like machines in which wire or rods or blanks of metal are automatically fed regular distances at predetermined intervals so that the sections fed may be operated upon by tools mounted on the spindle head or on a rotatory turret, or a carriage, or slide or lever according to the type of machine.

The object of the invention is to provide a tubular spindle of the class referred to, which is simple to construct, which can be easily and quickly assembled or disassembled for cleaning and repairing when necessary, which is readily adjusted, and which will feed the stock uniformly and accurately and will not vary as a result of any unevenness in the stock or wear of the parts.

The accompanying drawings illustrate the invention as embodied in two forms of tubular spindles which are designed more particularly for use in a multiple spindle automatic screw machine having radially movable and axially movable cutters adapted to operate upon the stock held by the spindles. The invention, however, is not limited to a spindle for a screw machine nor a machine having any specific number of spindles, nor a machine having a special character of cutters. The spindle which is the subject of this invention is serviceable in many types of automatic machines in which wire, rod or blank, is fed to tools that perform a great variety of operations.

Figure 1 of the views shows a longitudinal section of a tubular stock holding and feeding spindle embodying the invention, designed for use in an automatic screw machine. Fig. 2 shows a longitudinal section on larger scale of the forward end of the spindle. Fig. 3 shows a transverse section of the spindle on the plane indicated by the dotted line 3 3 on Fig. 2. Fig. 4 shows an enlarged longitudinal section of the rear end of the spindle. Fig. 5 shows a longitudinal section of a portion of the spindle taken on a plane at right angles to the plane of the section shown in Fig. 2. Fig. 6 shows a longitudinal section of the chuck closing sleeve. Fig. 7 shows a longitudinal section of a modified form of the spindle. Fig. 8 shows on larger scale a longitudinal section of the forward end of this form of the spindle. Fig. 9 shows a transverse section of the spindle taken on the plane indicated by the dotted line 9 9 on Fig. 8. Fig. 10 shows an enlarged longitudinal section of the rear end of the modified form of the spindle. Fig. 11 shows a longitudinal section of the chuck closing sleeve used in this form.

In the interior of the spindle is a feed tube 1. Attached to the forward end of the feed tube is a feed collet 2 which has spring jaws 3 so formed that when the feed tube is drawn back in the customary way the jaws slide on the stock which is held by the chuck, but when the feed tube is advanced the collet jaws grip the stock and feed it through the loosened jaws of the chuck.

On the rear end of the feed tube is a sleeve 4 which has a split flange 5 at its forward end. The exterior of the sleeve is threaded and turning on this thread is a split nut 6. The feed tube shown is designed to be moved backwardly and forwardly for feeding the stock by the engagement of any suitable means with the flange and the nut, and of course, the amount of feed and retrograde movement of the feed tube can be accurately determined by the adjustment of the sleeve on the feed tube and the nut on the sleeve, which parts after the desired adjustment has been obtained are securely clamped in position.

Outside of the feed tube is a chuck tube 7 the forward end of which butts against the rear end of the chuck 8 which has spring gripping jaws 9. Turning on the threaded rear end of the supporting tube 10 is a split nut 11 which is arranged to butt against the rear end of the chuck tube. The supporting tube is designed to be held in suitable bearings 12 against longitudinal movement, in the form shown, by thrust bearings 13 and a nut 14 which is screwed upon the threaded rear end of the supporting tube, and the position of the chuck tube and consequently the position of the chuck jaws with relation to the supporting tube and to the chuck closing sleeve 15 is determined by the position of the nut which is screwed upon the supporting tube and butts against the rear end of the chuck tube.

The supporting tube could be rotated by a belt but preferably as shown it is provided with a pinion 16 by means of which the spindle may be rotated.

The chuck closing sleeve is located inside of the forward end of the supporting tube and outside of the chuck tube and chuck and has an inwardly tapering flange 17 at its forward end that engages with the tapering outer face of the chuck jaws. This sleeve is forced forwardly by a spiral spring 18 that thrusts between the rear end of the closing sleeve and a shoulder in the interior of the supporting sleeve. When the closing sleeve is forward the chuck jaws spring open. When the closing sleeve is drawn back against the thrust of the spring, the chuck jaws are closed.

Fixed against longitudinal movement on the supporting tube is a collar 19 and pivotedly held by this collar are angle levers 20, the short arms of which are arranged to engage a collar 21 that is movable on the supporting tube, and the long arms of which are arranged to be engaged by the walls of the conical wedge 22. Extending from the collar 21 through slots in the supporting tube and into openings in the closing sleeve are screw studs 23. When the long arms of the levers are separated by the conical wedge the short arms engage the collar and through the pins draw back the chuck closing sleeve and cause it to close the chuck jaws. When the wedge is drawn from between the levers the spring forces the chuck sleeve forward so that the chuck jaws may open.

The wedge sleeve may be moved back and forth by any ordinary mechanism. In the first form shown this sleeve is provided with a cam 24 which may be engaged by a roll or stud on a cam cylinder or lever as the case may be.

The slots for the studs 23 in the supporting tube are longer than the diameters of the studs so that the collar and studs may be moved back and forth without interference, and the openings 25 in the chuck closing sleeve for the studs are preferably bayonet shape as shown in Fig. 6 so that when the closing sleeve is turned to one position it may be drawn out leaving the chuck free to be removed, but when it is turned to another position it is so held that the chuck is retained in place, and the sleeve will be drawn back by the studs.

In the second form of the invention shown the feed tube 26 is provided at its rear end with a grooved collar 27 for the engagement of the means which may be provided for reciprocating the feed tube. In this form of the invention the levers 28 are pivotedly mounted in a collar 29 that is fastened to the supporting tube 30. The short arms of these levers extend through the supporting tube into slots in the chuck closing sleeve 31 and by direct engagement with the walls of the slots tend to draw the chuck closing sleeve backwardly against the thrust of the spring 32 for closing the chuck 33. The long arms of these levers are adapted to be separated for drawing back the chuck closing sleeve and closing the chuck by the conical wedge 34 that is mounted on the supporting tube. This conical wedge carries a block 35 with a projection 36 with which the means for reciprocating the wedge may engage.

In both forms of the invention the chuck jaws, after they have once been adjusted with relation to the chuck closing sleeve, have no movement longitudinally either when they open or close. The part which moves longitudinally for closing the chuck jaws is the closing sleeve which at no time engages with the stock. As a result of this the chuck jaws close directly upon the stock and hold it in position. The stock is fed the exact distance required, by the feed tube and then the chuck is closed upon it without longitudinal movement. This permits the stock whether wire, rod or blanks to be fed accurately each time without having a gage or stop or other implement or part for determining the amount of feed and without making calculation for any movement of the chuck when closing upon the stock. This characteristic when the spindle is applied to a turret machine eliminates the necessity of having a feed stop or gage at one station of the turret and consequently saves time and increases the efficiency of the machine. The accuracy of the operations is also increased for the exact location of the part of the stock that has been fed through the chuck does not depend upon the diameter of the wire immediately held by the chuck jaws, nor is it dependent upon the exact adjustment of the parts that close the chuck jaws, as it is in cases where the chuck jaws are moved against the closing sleeve for closing. In such cases the movement of the chuck jaws in closing and consequently the feed of the wire varies, according to the wear of the parts and the size of the wire.

The construction described herein is cheap and easy to assemble and disassemble. If the chuck jaws become worn or broken it is only necessary to give the closing sleeve a turn and then withdraw it to leave the chuck free to be removed and a new one inserted. For this the entire spindle does not have to be dismantled. Furthermore the feed tube can instantly be removed from the spindle by simply pulling it out the rear end when desired, which features are of great importance when the spindle is used in an automatic multiple spindle screw machine.

The invention claimed is:

1. A stock spindle having a chuck tube, a chuck held against rearward movement by the chuck tube, a sleeve movable rearwardly for closing the chuck jaws, means for drawing the chuck closing sleeve rearwardly, means detachably connecting the chuck closing sleeve and the means for moving it rearwardly, and spring thrusting the chuck closing sleeve forwardly and retaining the said connecting means in engagement with the chuck closing sleeve, substantially as specified.

2. A stock spindle having a chuck tube, a chuck held against rearward movement by the chuck tube, a sleeve movable rearwardly for closing the chuck jaws, a collar loose on the spindle, a pin and bayonet-slot connection between said loose collar and the chuck closing sleeve, a collar fixed on the spindle, levers pivoted to the fixed collar and engaging the loose collar, and means for spreading the levers, substantially as specified.

3. A stock spindle having a chuck tube, a chuck held against rearward movement by the chuck tube, a sleeve movable rearwardly for closing the chuck jaws, means for drawing the chuck closing sleeve rearwardly, a pin and bayonet slot connection between the chuck closing sleeve and the means for drawing the sleeve rearwardly, and a spring thrusting the chuck closing sleeve forwardly and holding the said connection from dislocation, substantially as specified.

HARRY B. LESTER.

Witnesses:
  CHAS. F. BUDROE,
  ROBT. R. BEVERYLE.